US009692761B2

(12) United States Patent
Mareschal et al.

(10) Patent No.: US 9,692,761 B2
(45) Date of Patent: Jun. 27, 2017

(54) SYSTEM AND METHOD FOR CONTROLLING A DNS REQUEST

(71) Applicant: ARS NOVA Systems, Nantes (FR)

(72) Inventors: Yann Mareschal, Nantes (FR); Pierre Francois Romeuf, Ancenis (FR)

(73) Assignee: ARS NOVA SYSTEMS, Nantes (FR)

( * ) Notice: Subject to any disclaimer, the term of this patent is extended or adjusted under 35 U.S.C. 154(b) by 0 days.

(21) Appl. No.: 14/373,425

(22) PCT Filed: Jan. 21, 2013

(86) PCT No.: PCT/FR2013/050122
§ 371 (c)(1),
(2) Date: Jul. 21, 2014

(87) PCT Pub. No.: WO2013/110884
PCT Pub. Date: Aug. 1, 2013

(65) Prior Publication Data
US 2014/0373107 A1    Dec. 18, 2014

(30) Foreign Application Priority Data
Jan. 24, 2012    (FR) ..................................... 12 50674

(51) Int. Cl.
*H04L 12/22*    (2006.01)
*H04L 29/06*    (2006.01)
(Continued)

(52) U.S. Cl.
CPC .......... *H04L 63/10* (2013.01); *H04L 61/1511* (2013.01); *H04L 61/2007* (2013.01); *H04L 61/6068* (2013.01)

(58) Field of Classification Search
CPC ........... H04L 61/1511; G06F 17/30029; G06F 17/30699
See application file for complete search history.

(56) References Cited

U.S. PATENT DOCUMENTS

| 2005/0232229 | A1* | 10/2005 | Miyamoto | ........ H04L 29/06027 370/351 |
| 2011/0119306 | A1* | 5/2011 | Patil | .................. H04L 29/12066 707/783 |
| 2012/0158969 | A1* | 6/2012 | Dempsky | ............ H04L 61/6013 709/226 |

OTHER PUBLICATIONS

A New Approach for Combining Content-Based and Collaborative Filters. Kim et al. J Intell Inf Syst(2006).*
(Continued)

*Primary Examiner* — Venkat Perungavoor
(74) *Attorney, Agent, or Firm* — IPSILON USA, LLP

(57) ABSTRACT

A system and method of controlling communication. An appliance is provided with a program suitable for issuing a DNS request and a control program enabling the DNS request to be intercepted. The control program includes communications elements for communicating with a DNS server to which the DNS request is transmitted, and for communicating with another server for authorization. An authorization request, distinct from the DNS request, including an identifier of the user of the appliance and the domain name, is transmitted to the DNS server. The authorization server returns to the DNS server a response established as a function of the identifier of the user of the appliance and as a function of the domain name contained in the authorization request. The communications elements for communicating with the issuing program transmit to the issuing program an IP address defined as a function of the response from the authorization server.

17 Claims, 2 Drawing Sheets

Figure 1:
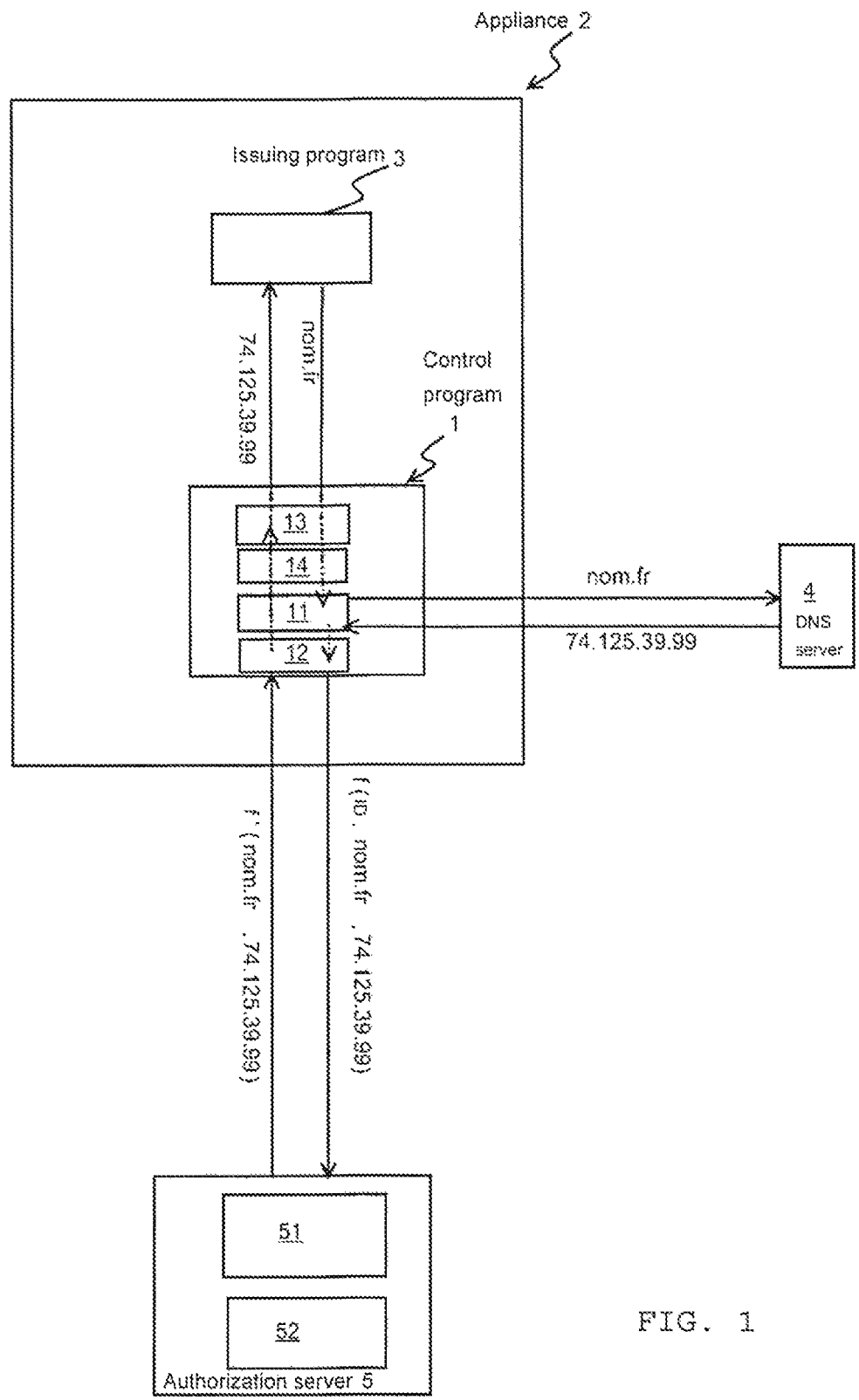

(51) Int. Cl.
*H04L 29/12* (2006.01)
*G06F 21/45* (2013.01)

(56) References Cited

OTHER PUBLICATIONS

User Profiles for Personalized Information Access. Gauch et al. LNCS(2007).*
Defending against Denial of Service attacks using Secure Name Resolution. Dewan et al. 2003.*
Proposal of an Adaptive Firewall System in Collaboration with Extended DNS. Jin et al. IEEE(2011).*
DNS Security. Lioy et al. Terena Networking Conference. May 22-25, 2000.*

* cited by examiner

SYSTEM AND METHOD FOR CONTROLLING A DNS REQUEST

In general manner, the present invention relates to systems for controlling communication.

More particularly, the invention relates to a system for controlling communication, e.g. for providing parental control, which system comprises an appliance, such as a computer, having both an issuing program, such as a web browser, that is suitable for issuing a request to access a domain name on the basis of which a domain name resolution request, referred to as a "DNS request", is generated, and also a control program that enables said DNS request to be intercepted.

Document US 2009/0157889 discloses a system for controlling communication that enables a domain name to be resolved by filtering the results as a function of the identity of the user of the appliance from which the DNS request is issued.

Nevertheless, in that technique, when the issuing program sends a request to access a domain name, the corresponding DNS request is modified so as to incorporate control information therein. Said modified DNS request is sent to a specific DNS server that enables the requested domain name to be resolved and filtered as a function of the control information.

Such a technique that consists in modifying the DNS request by adding information thereto necessarily interferes with the DNS protocol, and that can make the system unstable. The DNS server used to resolve such a DNS request must also be adapted to interpret the information that is added to the DNS requests, such that if said DNS server that is being used becomes unavailable, it cannot be replaced by a conventional DNS server in order to obtain the same result.

Also, the fact of incorporating additional information within the DNS request itself, over and above the usual information, i.e. the domain name and the address of the issuer, is a technique that is limited by the size of the DNS request, which request must comply with a predefined standard format. The quantity of information that can be introduced into a DNS request is thus small.

Also known in the prior art is document US 2007/204040, which proposes filtering and resolving DNS requests. Nevertheless, the system described in that document does not enable the DNS response to be filtered relative to the user of the appliance. Also, the architecture proposed in that document is not satisfactory. Specifically, the server that acts as the DNS server is interposed between a server that acts as an authorization server and the appliance, such that unavailability of the DNS server runs the risk of making the system inoperative.

An object of the present invention is to propose a novel system for controlling communication and a corresponding method that make it possible to intercept a DNS request issued by a program and to monitor the response associated with the DNS request in a manner that is simple, while consuming few resources, and without any risk of the system becoming unstable.

For this purpose, the invention provides a computer system for controlling communication, e.g. for providing parental control, the system comprising an appliance, such as a computer, having a first computer program, such as a web browser and referred to as an "issuing program", which program is suitable for issuing a request to access a domain name on the basis of which a request, referred to as a "DNS request", is generated to resolve the domain name;

said appliance also having a second computer program, referred to as a "control program", and enabling said DNS request to be intercepted;

the system being characterized in that said control program comprises:

communications means for communicating with a domain name resolution server, referred to as a "DNS server", which means are configured to transmit said DNS request to said DNS server, and to receive from said DNS server a response, referred to as a "DNS response", having the digital Internet address, referred to as an "IP address", corresponding to the requested domain name;

communications means for communicating with another server, referred to as an "authorization server" and distinct from said DNS server, which means are configured to send to said authorization server an authorization request that is distinct from the DNS request and that includes both an identifier of the user of the appliance and the domain name for which resolution has been requested, and to receive a response from said authorization server generated as a function of the identifier of the user of the appliance and as a function of the domain name contained in the authorization request; and communications means for communicating with said issuing program, which means are configured to transmit to said issuing program an IP address that is defined as a function of the response generated by the authorization server.

By using a control program that serves to communicate firstly with the DNS server and secondly with the authorization server, the authorization server and the DNS server can operate independently of each other. In particular, the authorization server and the DNS server can communicate with the control program independently of each other.

Thus, any failure of the DNS server does not in itself affect of the operation of the authorization server, and vice versa, thus enabling a DNS server that might become unavailable to be replaced by another without any risk of malfunction. Conversely, the technique described in document US 2007/204040 provides for interposing a server acting as a DNS server between the server acting as the authorization server and the user's appliance. It results from that architecture that a malfunction of the DNS server prevents the authorization server from functioning. Furthermore, as described in detail below, the technique described in document US 2007/204040 does not enable the user of the appliance to be identified, and it therefore cannot respond to the issuing program as a function of such a user identifier.

The fact of transmitting the intercepted DNS request to the DNS server without modification enables a conventional already-existing DNS server to be used for resolving the requested domain name, and thus makes it possible to use the DNS server that was configured in the original DNS agent of the appliance.

The system of the invention thus separates the function of resolving the domain name from the function of authorizing access to that domain name, thereby enabling the access of a program to a domain name to be controlled without any need to add a parameter in the DNS request, where that would require interfering with the DNS protocol.

The technique of the invention thus avoids any need to manage a DNS server that is dedicated to particular DNS requests that have been modified.

In particular, if the DNS server used by the system of the invention is not available, some other conventional DNS server can take over in order to resolve the requested domain name, where this is not possible in the technique described in document US 2009/0157889 in which only a specific DNS server can be used to interpret the control information contained in the modified DNS request.

The fact of incorporating an identifier of the user of the appliance in the authorization request makes it possible to verify whether access to the domain name specified in the DNS request is authorized and to filter the DNS response accordingly.

The fact that this identification parameter is the identity of the user of the appliance makes it possible to filter the results of the domain name resolution in a manner that is reliable and adapted to the user, unlike a technique using the IP address of the appliance in order to perform such filtering. Specifically, the IP address of an appliance might be modified or might be shared between a plurality of appliances, or indeed might be masked behind a router, and it is thus not necessarily characteristic of a user.

By separating resolution of the DNS request from filtering access to the requested domain name, the system of the invention makes it possible to condition the request for authorization on the identity of the user, such that the authorization server may be configured to handle only those authorization requests that include a recognized identifier, which means that it does not need to respond to all the requests it receives, as must be done by a DNS server.

The resolution workload is thus handled by the conventional DNS server, while the authorization server of the system of the invention handles an analysis workload that is limited to requests from users who have subscribed to the proposed control service.

Finally, unlike the technique of document US 2009/0157889 that provides for incorporating additional information in the DNS requests, the technique of the invention makes it possible to send a large amount of information since the authorization request is issued in addition to the DNS request and does not need to comply with the DNS standard.

According to an advantageous characteristic of the invention, said communications means for communicating with said issuing program are configured:
  when the response generated by the authorization server corresponds to authorizing access to the requested domain name, to transmit to said issuing program the IP address contained in the DNS response generated by the DNS server; and
  when the response generated by the authorization server corresponds to not authorizing access to the requested domain name, to transmit to said issuing program an IP address other than the IP address contained in the DNS response generated by the DNS server.

According to an advantageous characteristic of the invention, when said issuing program is an Internet browser, said other IP address transmitted to the Internet browser is the IP address of a page configured to execute instructions for displaying information that is selected as a function of the identifier of the user.

For this purpose, the control program comprises a service of the local web server type that makes it possible to provide said page with the identifier of the user of the appliance and to use redirection to display information associated with said user.

According to an advantageous characteristic of the invention, said control program also includes means for analyzing intercepted DNS requests in order to distinguish between requests, referred to as "primary requests", that are triggered by the user of the appliance, and requests, referred to as "secondary requests", that do not result from a direct action of the user; and
  if said intercepted DNS request is a secondary request, said communications means for communicating with said authorization server are configured not to send an authorization request, and said communications means for communicating with the issuing program are configured to transmit to said issuing program the IP address contained in the DNS response generated by the DNS server.

Analyzing intercepted DNS requests makes it possible to distinguish between primary DNS requests corresponding to the domain names of sites that are actually visited, and secondary requests that are issued automatically when loading the page of the site corresponding to the primary request. By distinguishing between primary requests and secondary requests, it is possible to omit authorization requests for secondary requests, so as to avoid overloading the authorization server.

Analyzing secondary and primary requests in this way makes it possible for the authorization server of the system of the invention to perform a number of authorization analyses that is smaller than the number of resolutions performed by the conventional DNS server, thereby limiting the workload of the authorization server and shortening the response time for the issuing program.

According to an advantageous characteristic of the invention, said means for analyzing intercepted DNS requests are configured to distinguish primary requests from secondary requests as a function of the time elapsed between the analyzed DNS request and the most recent user command; and/or
  as a function of the time interval between the analyzed DNS request and the preceding primary request; and/or
  as a function of the size of the homepage of the domain name requested in the analyzed DNS request.

According to an advantageous characteristic of the invention, said control program includes a cache storing the DNS responses corresponding to said DNS requests resolved by the DNS server; and
  if the DNS response corresponding to the intercepted DNS request is already present in the cache, said communications means for communicating with the issuing program are configured to transmit to said issuing program the IP address contained in said DNS response stored in the cache.

The use of a cache for storing the responses associated with the domain names that have already been resolved makes it possible to save on resources.

According to an advantageous characteristic of the invention, said communications means for communicating with the authorization server are also configured to send an authorization request including an identifier of said issuing program; and
  said authorization server is also configured to generate a response to said authorization request as a function of the identifier of the issuing program.

According to an advantageous characteristic of the invention, said appliance includes a DNS agent, referred to as an "original DNS agent", that serves to generate a request using the DNS protocol to query a DNS server in order to resolve the domain name with which the issuing program is seeking to make a connection; and
  said control program includes a configuration agent for storing the address of the DNS server, referred to as the "original DNS server", as configured in the original DNS agent of the appliance and for reconfiguring said original DNS agent to send DNS requests to said communications means for communicating with the control program;

the configuration agent also being programmed to set the communications means for communicating with the control program by defining said original DNS server as being the DNS server to be used for resolving intercepted DNS requests.

The invention also provides an installation comprising a system as described above and an authorization server suitable for transmitting, to the control program, a response to the authorization request as a function of the identifier of the user of the appliance and of the domain name contained in the authorization request;

the installation being characterized in that said authorization server includes a database made up of domain names associated with user identifiers, and analysis means capable of using the database to determine whether access to the domain name contained in the authorization request is authorized for the user identifier contained in said request.

According to an advantageous characteristic of the invention, the authorization server includes means for encrypting the response generated by the authorization server, and said communications means for communicating with the authorization server include means for decrypting said response.

Conversely, said means for communicating with the authorization server include means for encrypting the authorization request and the authorization server includes means for decrypting said authorization request.

The invention also provides a method of controlling data exchange, e.g. for parental control, between:

a first computer program, such as a web browser and referred to as an "issuing program", that is installed in an appliance, such as a computer, and that is suitable for issuing a request to access a domain name on the basis of which a domain name resolution request, referred to as a "DNS request", is generated;

a domain name resolution server, referred to as a "DNS server"; and another server, referred to as an "authorization server" and distinct from said DNS server;

said method being characterized in that it comprises the following steps:

a second program, referred to as a "control program", intercepting said DNS request;

the control program transferring said DNS request to the DNS server;

the control program receiving a DNS response generated by said DNS server and including a digital Internet address, referred to as an "IP address", that corresponds to the requested domain name;

the control program transmitting, to said authorization server, an authorization request that is distinct from the DNS request and that includes an identifier of the user of the appliance and the domain name for which resolution has been requested the control program receiving a response generated by the authorization server as a function of the identifier of the user of the appliance and of the domain name contained in the authorization request; and the control program transmitting to said issuing program an IP address that is defined as a function of the response generated by the authorization server.

An IP address is transmitted to the issuing program by sending a DNS response containing said IP address to said issuing program. This DNS response corresponds to the response generated by the DNS server, possibly as modified in order to replace the IP address corresponding to the domain name as resolved by the DNS server with another IP address, in the event of the response from the authorization server being negative. The DNS response transmitted to said issuing program may also include a lifetime setting that is modified compared with the setting contained in the DNS response generated by the DNS server.

According to an advantageous characteristic of the invention, the content of the response from the authorization server depends on an analysis step that determines whether access to the domain name contained in the authorization request is authorized for the user identifier contained in said authorization request.

According to an advantageous characteristic of the invention:

when the response generated by the authorization server corresponds to authorizing access to the requested domain name, the IP address transmitted to said issuing program is the IP address contained in the DNS response generated by the DNS server; and when the response generated by the authorization server corresponds to not authorizing access to the requested domain name, the IP address transmitted to said issuing program is an IP address other than the IP address contained in the DNS response generated by the DNS server.

According to an advantageous characteristic of the invention, said method includes a step of analyzing the intercepted DNS requests in order to distinguish requests referred to as "primary requests", that are triggered by the user from requests referred to as "secondary requests", that do not result from a direct action of the user; and if the analyzed DNS request is a secondary request, no authorization request associated with this secondary request is sent, and the IP address contained in the DNS response generated by the DNS server is transmitted to said issuing program.

According to an advantageous characteristic of the invention, said appliance includes a DNS agent, referred to as an "original DNS agent", that serves to generate a request using the DNS protocol to query a DNS server in order to resolve the domain name with which the issuing program is seeking to make a connection, said control program includes a configuration agent for storing the address of the DNS server, referred to as the "original DNS server", as configured in the original DNS agent of the appliance and for reconfiguring said original DNS agent to send DNS requests to said communications means for communicating with the control program, the configuration agent also setting the communications means for communicating with the control program by defining said original DNS server as being the DNS server to be used for resolving intercepted DNS requests.

The invention also provides a computer program, e.g. for parental control, including program code instructions for executing steps of the method as described above, when said program is executed on a computer.

Figure 2:
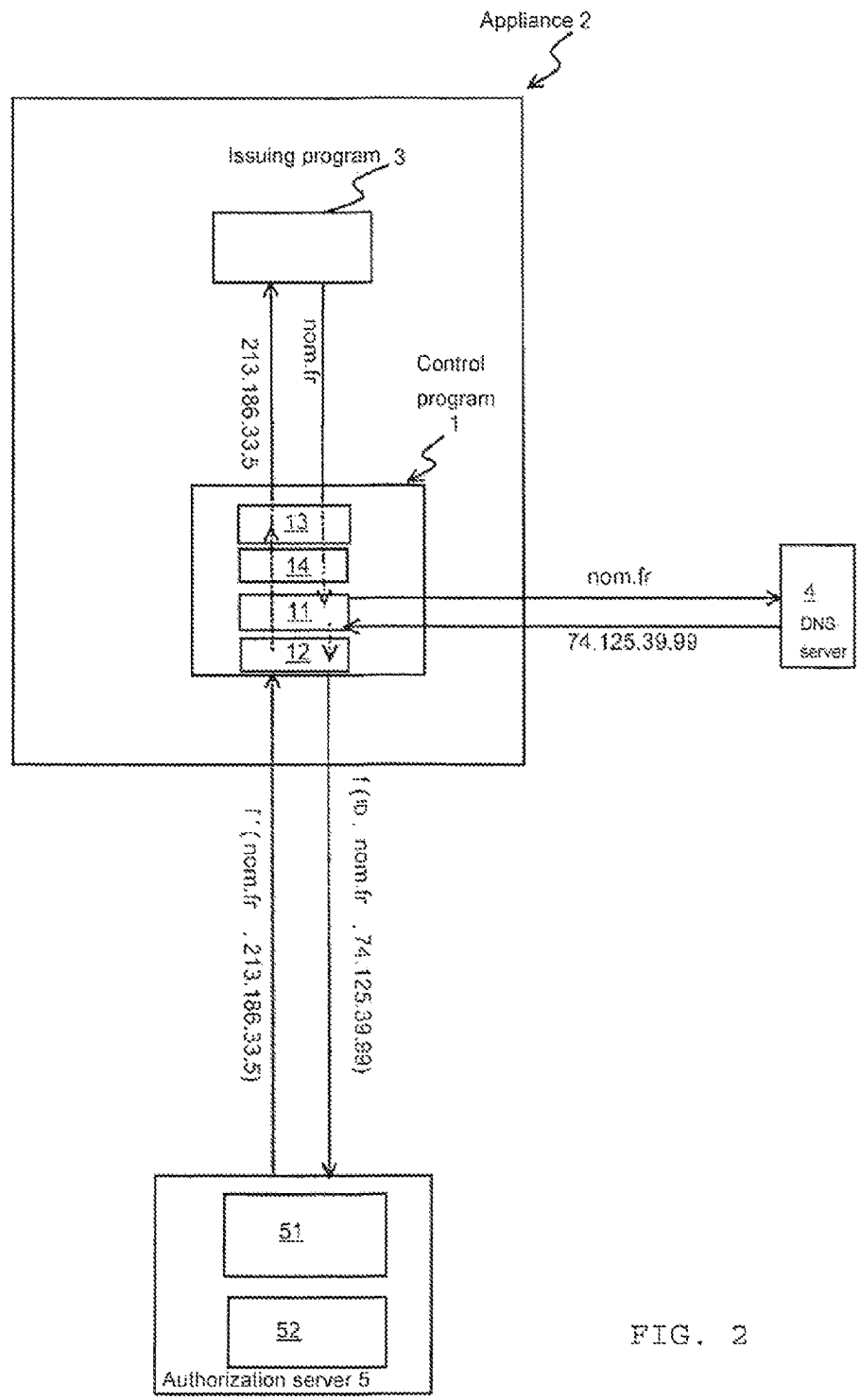

The invention can be well understood on reading the following description of embodiments given with reference to the accompanying drawings, in which:

FIG. 1 is a diagrammatic view of the installation of the invention in which data exchanges are shown between the appliance having the control program, the DNS server, and the authorization server in the context of a positive response from the authorization server; and FIG. 2 is a view of the FIG. 1 installation in the context of a negative response from said authorization server.

With reference to the figures and as mentioned above, the invention relates to a communication control system. The system of the invention finds a particularly advantageous application in the field of parental control.

Said system comprises an appliance 2, such as a personal computer, a tablet, a smart phone, or indeed a games console. More generally, said appliance 2 is in the form of an electronic and computer system having an operating system for controlling the execution of programs. Said appliance 2 has Internet connection means for communicating with external servers 4, 5 as described in detail below.

Said appliance 2 includes a program 3 such as a web browser suitable for issuing a request to access a domain name. Said program 3 is referred to as the "issuing program". Accessing a domain name requires a domain addressing system, known as the domain name system (DNS), which is a system of databases and servers that ensure correspondence between domain or site names (corresponding to servers hosting the content of said site) as used by Internet users and numerical addresses suitable for use by computers.

Said appliance 2 include a DNS agent (not shown) referred to as the "original DNS agent", that serves to generate a request using the DNS protocol to query a DNS server in order to resolve the domain name to which the issuing program 3 seeks to be connected, i.e. to find the IP address corresponding to said domain name. Advantageously, said original DNS agent is present in the appliance before the control program is installed.

Said appliance 2 is also provided with a control program 1, preferably a resident program, that serves to intercept said DNS request and to control the corresponding DNS response as described in detail below.

In the description below, said issuing program 3 that requests resolution of a domain name is an Internet browser. Naturally, the program could equally well be some other type of program, such as an email client, or an instant messaging client.

The control program 1 has communications means 11 for communicating with an external server 4 for domain name resolution, referred to as a "DNS server" 4.

In particular, the control program 1 includes a configuration agent that serves to store the address of the DNS server, referred to as the "original DNS server", that is configured in the original DNS agent of the appliance and to reconfigure said original DNS agent to direct DNS requests to said communications means 11 of the control program 1. The configuration agent sets the communications means 11 of the control program by defining said original DNS server as being the DNS server 4 for use in resolving intercepted DNS resolution requests.

Conversely, the solution of Document US 2009/0157889 modifies the DNS request in order to add a parameter within that DNS request, which requires a specific DNS server configured to intercept the modified DNS request, and which thus does not make it possible to conserve the DNS server as configured in the original DNS agent of the appliance.

The authorization server may operate independently of the DNS server. In particular, in the example shown in the figures, the DNS server and the authorization server do not communicate with each other, but each of them communicates with the control program. Conversely, the system described in Document US 2007/204040 makes the server act as the authorization server dependent on the server that acts as the DNS server by virtue of the fact that the DNS server is positioned between the appliance and the server forming the authorization server, such that if the DNS server is unavailable, the authorization server is not operational.

The configuration agent of the communications means 11 is also configured, in the event of the control program 1 being deinstalled, to reset the original DNS agent of the appliance with said original DNS server.

Thus, said communications means 11 transmit the intercepted DNS request to said DNS server 4. In the example shown in the figures, the DNS request transferred by the communications means 11 to the DNS server 4 is unchanged compared with the intercepted request, in the sense that no additional parameter is introduced into the DNS request transmitted to said DNS server 4. In the example shown in FIGS. 1 and 2, the domain name contained in this request is "nom.fr" where the term "nom" is the radical of the requested domain name.

As described in detail below, transmission of this DNS request to the DNS server 4 may be conditional on information contained in a cache 14 of said control program 1.

Said communications means 11 thus make it possible to receive, and thus to intercept, the DNS response generated by the DNS server 4 that contains the IP address corresponding to the requested domain name. In the example shown in FIG. 1, the IP address corresponding to said domain name nom.fr is 74.125.39.39.

The DNS server 4 that thus receives the DNS request from the control program 1 resolves the associated domain name and sends the corresponding IP address to the communications means 11 of the control program 1. The control program 1 thus acts during those steps as a client or DNS proxy agent since it acts as a DNS agent and is interposed between the original DNS agent (not shown) of the appliance 2 and the DNS server 4.

Thus, as described in detail below, the control program 1 can monitor the DNS responses from the external DNS server 4 while continuing to use the DNS server as originally defined in the original DNS agent of the appliance for the purpose of resolving the requested domain name.

The control program 1 thus includes communications means 12 for communicating with another external server 5 referred to as the "authorization server", which server is distinct from said DNS server 4.

Said communications means 12 are configured to issue an authorization request to said authorization server 5, which authorization request includes an identifier ID of the user of the appliance and the domain name that is to be resolved via said DNS request. This authorization request is distinct from the DNS request as resolved by the DNS server 4. Said authorization request makes it possible to request authorization to access the domain name corresponding to said DNS request, given the user identifier ID.

This user identifier ID of the appliance includes data characteristic of the user, such as the session identifier associated with the user on opening a session on the appliance 2. The user identifier ID of the appliance preferably also includes data characteristic of the appliance 2 in use, such as its medium access control (MAC) address and/or data characteristic of the control program 1, such as a registration or enrollment number associated with said control program installed on the appliance 2.

Thus, the user identifier ID of the appliance may be made up of a plurality of data items.

This identifier ID is different from the IP address of the appliance 2 or of a router behind which said appliance 2 is to be found, thereby making it possible to filter the DNS responses as a function of the identity of the user of said appliance, and thus provide reliable control over access to domain names. Said appliance 2 may be used by different users, each having their own identifiers and thus potentially having different access rules. Said user may also use different appliances, in which case provision is made to be able to define the different identifiers as being those of a single user so that the same rules are applied by the authorization server to these identifiers.

Advantageously, the information exchanged between the control program 1 and the authorization server 5 is encrypted, for example using the hypertext transfer protocol secure (HTTPS) protocol. Thus, a third party cannot determine the filtering associated with a domain name for a user of the control program.

Said authorization server 5 generates a response as a function of the user identifier ID for the user of the appliance and of the domain name contained in said authorization request. This response corresponds to access to the resolved domain name being authorized or not authorized.

To this end, said authorization server 5 has a database 52 made up of domain names associated with user identifiers with or without authorization for those user identifiers to access the corresponding domain name. Advantageously, the database is updated regularly with the help of a program for analyzing and classifying domain names.

Said authorization server 5 also has analysis means 51 making it possible on the basis of this database to determine whether the domain name contained in the authorization request is authorized for the user identifier contained in said request.

Said control program 1 also has communications means 13 for communicating with said issuing program 3 in order to transmit an IP address to said issuing program 3, which IP address is defined as a function of said response from the authorization server 5. In the event of the response being positive, provision may be made for the response that is transmitted to the control program 1 to contain the IP address of the resolved domain name. In the example shown in FIG. 1, this IP address is 75.125.39.39.

Conversely, in the event of a negative response, provision may be made for the response to be transmitted to the control program 1 to contain an IP address of a page used for calling an application configured to display information that depends on the identifier of the user. In the example shown in FIG. 2, this IP address is 213.186.33.5.

In the example shown in FIGS. 1 and 2, the authorization request includes in addition to the requested domain name and the user identifier ID, the IP address corresponding to the domain name as resolved by the DNS server 4. Designing the authorization request in this way simplifies exchanges between the control program 1 and the authorization server 5 since in the event of a positive response, the authorization server 5 merely returns said IP address to the control program 1 which forwards it, via the communications means 13, to the issuing program 3.

In a variant, provision may be made not to incorporate the IP address corresponding to the resolved domain name in the authorization request, thus enabling the DNS request to be transmitted simultaneously with the authorization request to the respective servers 4 and 5. Under such circumstances, the response from the authorization server 5 includes information that is interpreted by the control program 1 as being positive or negative, and said control program 1, e.g. acting via said communications means 13, then sends the IP address corresponding to the domain name resolved by the DNS server 4 to the issuing program 3 in the event of a response that is positive, or some other IP address in the event of a response that is negative.

The control program includes a cache 14 storing DNS responses associated with the DNS request resolved by the DNS server 4. Each DNS response includes an IP address and one or more items of information associated therewith, such as a validity duration for the response, known as its "time to live" (TTL), which corresponds to a lifetime after which the DNS response is removed from the cache 14. The presence of such a cache 14 makes it possible to optimize the sending of DNS requests so as to avoid sending a DNS request again if it corresponds to a request that has already been resolved.

Thus, in the event of a DNS response corresponding to the intercepted DNS request already being present in the cache 14, said communications means 13 communicating with the issuing program 3 forward the IP address associated with said result to said issuing program 3.

Conversely, if no DNS response corresponding to said intercepting DNS request is contained in the cache 14, said communications means 11 transmit the DNS request to the DNS server 4.

Advantageously, with a positive response, the authorization server may introduce a lifetime setting such that the control program 1 stores in its cache 14 a DNS response formed by the IP address corresponding to the resolved domain name in association with a lifetime defined by the authorization server 5 instead of the lifetime defined by the DNS server 4. This characteristic is particularly advantageous when the domain name is not known to the authorization server 5. The authorization server 5 may then authorize access to the domain name with a short lifetime, while waiting for said domain name to be analyzed.

During said lifetime, the authorization server can analyze and classify the requested domain name, and after said lifetime has elapsed and a new authorization request is made for this domain name, the authorization server can provide a response that is positive or negative as a function of the result of the analysis and of the identifier of the user.

The step of requesting authorization is not performed if the request corresponds to a secondary request, i.e. an automatic request that does not stem directly from a user command, as explained below.

Said appliance 2 and each server 4, 5 is an electronic and computer unit that enables computer instructions to be executed. When it is specified that an article such as an appliance, a server, or a program includes means for and/or is configured to execute a given action, that means that the corresponding electronic and computer system has computer instructions enabling said action to be executed.

The control program 1 has means for analyzing intercepted DNS requests in order to distinguish between requests referred to as "primary requests" that are triggered by the user of the appliance and requests "secondary requests", that do not result from any direct action on the part of the user. Said secondary requests correspond to automatic requests. These automatic requests generally follow on from the main requests. By way of example, said secondary requests may be advertising requests and/or statistical requests generated by a page that is downloaded in response to a main request.

If the intercepted DNS request is a secondary request, said communications means 12 communicating with said authorization server 5 are configured not to send an authorization request, and said communications means 13 for communicating with the issuing program 3 then forward to said program 3 the IP address corresponding to the domain name of said secondary request as resolved by the external DNS server 4.

Determining which requests are primary requests as contrasted with secondary requests may be performed as a function of the time that elapses between the analyzed DNS request and the most recent user command, such as a mouse click, a key stroke, a touch action, or a voice, video, or other command. It is thus possible to consider that a DNS request that is intercepted while the user has not been active for at least some predetermined duration is a secondary request.

Said determination step may also be performed as a function of the time interval between the analyzed DNS request and the preceding primary request issued by said issuing program 3. It can thus be considered that when the time interval between an intercepted DNS request and the most recent primary request associated with the issuing program is shorter than a predefined duration, then said intercepted DNS request is a secondary request.

Said determination step may also be performed as a function of the size of the home page of the domain name requested in the analyzed DNS request. It can thus be considered that when the size of the home page of the requested domain name is less than a predefined size, then said request is a secondary request.

Advantageously, the analysis of an intercepted DNS request takes account of the identity of the issuing program, thus enabling DNS requests issued by an instant messaging service, for example, not to interfere with the analysis of requests issued by a browser. The identity of the issuing program is determined by a table, generally referred to as a user-datagram protocol (UDP) table, that enables the current network connections using the protocol in question to be determined (UDP, protocol for transporting DNS requests).

In particular, provision may be made to consider that all requests issued by an issuing program other than a browser are primary requests.

In the absence of an authorization request being sent, because of the presence of a corresponding DNS response in the cache or because the intercepted DNS request is a secondary request, the IP address contained in the response and/or corresponding to the resolved domain name is forwarded to the issuing program 3.

Preferably, if the control program 1 does not receive a response from the authorization server at the end of a predefined duration, the IP address associated with the domain name is forwarded to the issuing program 3, so that unavailability of the authorization server 5 does not prevent the issuing program 3 from operating. In the event of the authorization server 5 not being available, provision may be made to reinterrogate it only after a certain predefined duration has elapsed in order to avoid overloading the authorization server 5 and avoid consuming resources.

The present invention is not limited in any way to the embodiments described and shown, and the person skilled in the art will know how to make any variation in accordance with its spirit.

The invention claimed is:

1. A computer system for controlling communication, the system comprising an appliance having a first issuing computer program, which first issuing computer program is suitable for issuing a request to access a domain name on the basis of which a DNS request is generated to resolve the domain name, said appliance also having a second control computer program that enables said DNS request to be intercepted;

wherein said second control computer program of said computer system comprises: first communications means for communicating with a domain name resolution server, referred to as a DNS server, which means are configured to transmit said DNS request to said DNS server without modification of said DNS request, and to receive from said DNS server a DNS response having the digital Internet IP address corresponding to the requested domain name; second communications means for communicating with an authorization server distinct from said DNS server, said second communications means are configured to send to said authorization server an authorization request that is distinct from the DNS request and that includes both an identifier of the user of the appliance and the domain name for which resolution has been requested, and to receive a response from said authorization server generated as a function of the identifier of the user of the appliance and as a function of the domain name contained in the authorization request; and third communications means for communicating with said first issuing computer program, said third communications means being configured to transmit to said first issuing computer program an IP address that is defined as a function of the response that has been generated by the authorization server as a function of the user identifier and of the domain name contained in the authorization request, wherein said first communications means are configured for:

when said response generated by the authorization server corresponds to authorizing access to the requested domain name, transmitting to said first issuing computer program the IP address contained in the DNS response generated by the DNS server; and when said response generated by the authorization server corresponds to not authorizing access to the requested domain name, transmitting to said first issuing computer program an IP address other than the IP address contained in the DNS response generated by the DNS server.

2. A system according to claim 1, wherein when said first issuing computer program is an Internet browser, said another IP address transmitted to the Internet browser is the IP address of a page configured to execute instructions for displaying information that is selected as a function of the identifier of the user.

3. A system according to claim 1, wherein said second control computer program also includes means for analyzing intercepted DNS requests in order to distinguish between primary requests that are triggered by the user of the appliance, and secondary requests that do not result from a direct action of the user; and in that, if said intercepted DNS request is a secondary request, said second communications means are configured not to send an authorization request and said third communications means are configured to transmit to said first issuing computer program the IP address contained in the DNS response generated by the DNS server.

4. A system according to claim 3, wherein said means for analyzing intercepted DNS requests are configured to distinguish primary requests from secondary requests as a function of the time elapsed between the analyzed DNS request and the most recent user command; and/or as a function of the time interval between the analyzed DNS request and the preceding primary request; and/or as a function of the size of the homepage of the domain name requested in the analyzed DNS request.

5. A system according to claim 1, wherein said second control computer program includes a cache storing the DNS responses corresponding to said DNS requests resolved by the DNS server; and in that, if the DNS response corresponding to the intercepted DNS request is already present in the cache, said third communications means are configured to transmit to said first issuing computer program the IP address contained in said DNS response stored in the cache.

6. A system according to claim 1, wherein said second communications means are also configured to send an authorization request including an identifier of said issuing program; and in that said authorization server is also configured to generate a response to said authorization request as a function of the identifier of the first issuing computer program.

7. A system according to claim 1, wherein said appliance includes an original DNS agent that serves to generate a request using the DNS protocol to query a DNS server in order to resolve the domain name with which the first issuing computer program is seeking to make a connection; and said second control computer program includes a configuration agent for storing the address of the original DNS server as configured in the original DNS agent of the appliance and for reconfiguring said original DNS agent to send DNS requests to said first communications means; the configuration agent also being programmed to set the first communications means by defining said original DNS server as being the DNS server to be used for resolving intercepted DNS requests.

8. An installation including a system according to claim 1, and an authorization server suitable for transmitting, to the second control computer program, a response to the authorization request as a function of the identifier (ID) of the user of the appliance and of the domain name contained in the authorization request; wherein said authorization server includes a database made up of domain names associated with user identifiers, and analysis means capable of using the database to determine whether access to the domain name contained in the authorization request is authorized for the user identifier contained in said request.

9. An installation according to claim 8, wherein the authorization server includes means for encrypting the response generated by the authorization server; and in that said second communications means include means for decrypting said response.

10. A method of controlling data exchange, between: a first issuing computer program, and that is suitable for issuing a DNS request to access a domain name on the basis of which a domain name resolution request, is generated; a domain name resolution DNS server; and another authorization server, distinct from said DNS server; said method being comprising the steps of:
a second control program, intercepting said DNS request; the control program transferring said DNS request to the DNS server without modification of said DNS request; the second control computer program receiving a DNS response generated by said DNS server and including a digital Internet IP address, that corresponds to the requested domain name; the control program transmitting, to said authorization server, an authorization request that is distinct from the DNS request and that includes an identifier (ID) of the user of the appliance and the domain name for which resolution has been requested the control program receiving a response generated by the authorization server as a function of the identifier of the user of the appliance and of the domain name contained in the authorization request; and the second control computer program transmitting to said issuing program an IP address that is defined as a function of the response generated by the authorization server as a function of the user identifier and of the domain name contained in the authorization request, wherein when said response generated by the authorization server corresponds to authorizing access to the requested domain name, the IP address transmitted to said first issuing computer program is the IP address contained in the DNS response generated by the DNS server; and when said response generated by the authorization server corresponds to not authorizing access to the requested domain name, the IP address transmitted to said first issuing computer program is an IP address other than the IP address contained in the DNS response generated by the DNS server.

11. A method according to claim 10, wherein the content of the response from the authorization server depends on an analysis step that determines whether access to the domain name contained in the authorization request is authorized for the user identifier contained in said authorization request.

12. A method according to claim 10, wherein said method includes a step of analyzing the intercepted DNS requests in order to distinguish primary requests, that are triggered by the user from secondary requests, that do not result from a direct action of the user; and in that if the analyzed DNS request is a secondary request, no authorization request associated with this secondary request is sent, and the IP address contained in the DNS response generated by the DNS server is transmitted to said first issuing computer program.

13. A method according to claim 10, said appliance includes an original DNS agent, that serves to generate a request using the DNS protocol to query a DNS server in order to resolve the domain name with which the first issuing computer program is seeking to make a connection; said second control computer program includes a configuration agent for storing the address of the original DNS server, as configured in the original DNS agent of the appliance and for reconfiguring said original DNS agent to send DNS requests to said first communications means; the configuration agent also setting the first communications means by defining said original DNS server as being the DNS server to be used for resolving intercepted DNS requests.

14. A system according to claim 1, wherein said second control computer program also includes means for analyzing intercepted DNS requests in order to distinguish between primary requests, that are triggered by the user of the appliance, and secondary requests, that do not result from a direct action of the user; and in that, if said intercepted DNS request is a secondary request, said second communications means for are configured not to send an authorization request, and said third communications means are configured to transmit to said first issuing computer program the IP address contained in the DNS response generated by the DNS server.

15. A system according to claim 1, wherein said second control computer program includes a cache storing the DNS responses corresponding to said DNS requests resolved by the DNS server; and in that, if the DNS response corresponding to the intercepted DNS request is already present in the cache, said third communications means for are configured to transmit to said first issuing computer program the IP address contained in said DNS response stored in the cache.

16. A system according to claim 1, wherein said second communications means also configured to send an authorization request including an identifier of said first issuing computer program; and in that said authorization server is also configured to generate a response to said authorization request as a function of the identifier of the first issuing computer program.

17. A method according to claim 11, when the response generated by the authorization server corresponds to authorizing access to the requested domain name, the IP address transmitted to said first issuing computer program is the IP address contained in the DNS response generated by the DNS server; and when the response generated by the authorization server corresponds to not authorizing access to the requested domain name, the IP address transmitted to said first issuing computer program is an IP address other than the IP address contained in the DNS response generated by the DNS server.

* * * * *